INVENTORS
CHARLES W. TRACY and
WAYNE H. COLONEY

BY
ATTORNEYS

Jan. 28, 1969

C. W. TRACY ET AL  
ROOF FRAMING SYSTEM 3,423,898

Filed July 28, 1966

INVENTORS  
CHARLES W. TRACY and  
WAYNE H. COLONEY

BY  
ATTORNEYS

Jan. 28, 1969

C. W. TRACY ET AL

3,423,898

ROOF FRAMING SYSTEM

Filed July 28, 1966

INVENTORS
CHARLES W. TRACY and
WAYNE H. COLONEY

BY
ATTORNEYS

United States Patent Office 3,423,898
Patented Jan. 28, 1969

3,423,898
ROOF FRAMING SYSTEM
Charles W. Tracy and Wayne H. Coloney, Tallahassee, Fla., assignors to International Enterprises, Inc., Tallahassee, Fla.
Continuation-in-part of application Ser. No. 472,944, July 19, 1965. This application July 28, 1966, Ser. No. 568,686
U.S. Cl. 52—713  5 Claims
Int. Cl. E04b 1/48, 7/06

ABSTRACT OF THE DISCLOSURE

Apparatus including a bracket used in the construction of the roof of a building with such bracket being mountable on a ridge beam and having relatively adjustable portions with overlapping tabs. Each of the tabs has a plurality of openings some of which will be in alignment with each other. A rafter is connected to the ridge beam at any desired angle by such bracket.

---

This invention is an improvement over copending application Ser. No. 423,988 now patent 3,333,875 and a continuation-in-part of Ser. No. 472,944 now abandoned, and relates to the construction of buildings of various kinds and to apparatus and equipment providing labor-saving devices whereby the building can be erected in a minimum of time and with minimum effort by relatively unskilled workmen.

The invention relates particularly to the construction of the frame structure of the roof of the building and to apparatus and equipment including an adjustable bracket system by which relatively unskilled workmen can erect such frame structure in a minimum of time and with increased accuracy by substantially eliminating the necessity of cutting or notching the rafters regardless of the physical location thereof.

Heretofore roof structures have been produced in various ways, including by the cutting and fitting together of timbers by skilled workmen to withstand the stresses and strains imposed thereon by the natural elements and by man. These prior structures have not been satisfactory due to the time required, as well as the excessive wastage of material. Also, many devices have been produced to assist in the computation and cutting of the timbers; however, these have been so complicated and expensive that the average workman either could not understand their operation or could not afford them.

An attempt has been made in copending application Ser. No. 423,988 to overcome these objections by providing brackets which eliminate the necessity of cutting the timbers. These brackets satisfactorily served the purpose for which they were intended; however, it has been found that since these brackets were fixed and since the angular characteristics of roofs varied over a wide range, a large stock of brackets of each type was required.

Summary of the Invention

The present invention is a roof framing system having an adjustable bracket mountable on a ridge beam, hip beam or valley beam and having relatively adjustable portions with outwardly extending tabs on each. Each of the tabs has a series of openings and the tabs of one portion are in overlapping relation with the tabs of the other portion so that at least some of the openings are in alignment with each other. A rafter which may have a square end is located within the bracket and is connected thereto by one or more fasteners passing through the aligned openings into the rafter. The bracket is adjustable to accommodate rafters regardless of the pitch of the roof.

It is an object of the invention to provide a roof framing system having adjustable brackets for the erection of roof frames by relatively unskilled workmen and in which such brackets are adjustable to any desired pitch of roof and adapted to receive conventional roofing timbers without cutting or notching the same.

Another object of the invention is to provide adjustable brackets for a roof framing system to facilitate the construction of ridges, hips, valleys, and other shapes in a minimum of time by relatively unskilled workmen.

Other objects and advantages of the invention will be apparent from the following description considered in conjunction with the accompanying drawings wherein:

Briefly stated the present invention is a roof framing system including a series of adjustable brackets which can be used with conventional rafters or timbers to erect the frame of a roof of any desired configuration or architectural design. In such construction a ridge beam is provided with a series of brackets adjustable to any desired pitch of the roof and spaced in accordance with local building codes and cooperating with a corresponding series of anchor brackets mounted along the plate of the upper wall of the structure. Rafters or other timbers are cut to a predetermined size and placed within the brackets and secured therein by nails or other fasteners in such a manner that no additional cutting is necessary either before or after the rafters are placed in position. Additional adjustable brackets are provided for connecting hip and valley beams to the ridge beam and for connecting jack rafters and king rafters to the hip and valley beams and the ridge beam, respectively. In this manner a roof frame may be produced which may be either straight with a ridge extending the full length of the building, or a complex roof with one or more ridges as well as hips, valleys, or the like.

Figure 1:
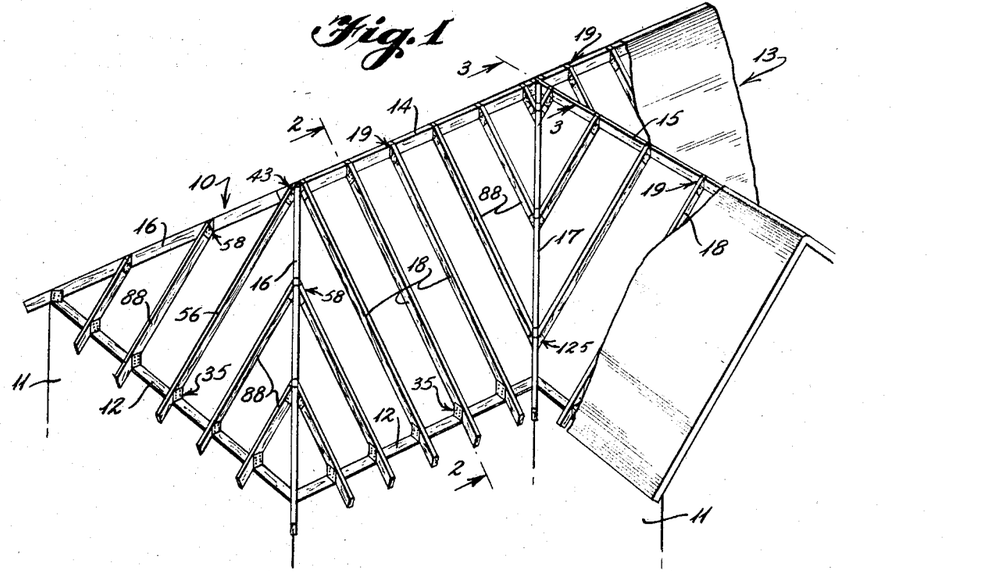
FIG. 1 is a perspective illustrating a roof frame of a design providing ridges, hips and valleys.

With continued reference to the drawings, a building 10 is provided having generally upright side walls 11 of conventional construction with studs or upright members (not shown) connected at their upper ends by a plate 12. A roof 13 is adapted to be erected on the side walls 11 and such roof may be of simple construction with a ridge extending the full length thereof, or may be of complex construction with a plurality of ridges, hips and valleys connected to the side walls by rafters or the like. With reference to FIG. 1, the building 10 is illustrated as having a main ridge beam 14 and an auxiliary ridge beam 15 forming an L-shaped or T-shaped building. The main ridge beam 14 terminates in a pair of angularly disposed hips 16 and the confluence of the roof defined by the main and auxiliary ridge beams may join along a valley 17. A plurality of rafters 18 connect the main and auxiliary ridge beams to the top plate 12 at certain predetermined spacings in accordance with local building codes.

In order to connect the rafters 18 to the main and auxiliary ridge beams 14 and 15, respectively, a plurality of adjustable double ridge brackets 19 (FIGS. 2, 6 & 14) are provided, each having a central or fastening portion 20 with openings 21 therein and adapted to overlie the ridge beam and be connected thereto by nails or other fasteners 22. Such central portion is connected along bend lines 23 at opposite sides to downwardly extending portions 24 which in turn are connected along bend lines 25 to outwardly extending portions 26. Each of the downwardly extending portions 24 is connected along bend lines 27 to a pair of opposed tabs or flaps 28 having a plurality of arcuately disposed openings 29. Each of the outwardly extending portions 26 is connected along bend lines 30 to a pair of opposed tabs or flaps 31 having a plurality of arcuate, relatively short interrupted slots 32 disposed on substantially the same radius as the openings 29. As illustrated best in FIG. 6, the tabs 31 are bent upwardly and thereafter the portion 26 is bent along the lines 25. The tabs 28 then are bent upwardly to overlie the tabs 31 in a manner that the openings 29 and slots 32 will be in alignment and adapted to receive a nail or other fastener 22 to secure the bracket to the upper end of the rafter 18. As illustrated in FIG. 3, one-half of the bracket 19 is adjusted to accommodate a rafter 18 while the other half of such bracket receives one end of the auxiliary ridge beam 15 to connect the same to the main ridge beam 14. If desired, each of the downwardly extending portions 24 may be provided with a tab 33 extending upwardly from the bend line 25 and such tab may have an opening 33' for the reception of a nail or other fastener. Also, each of the flaps 28 may have a tab 34 connected to the bend line 27 and provided with a nail receiving opening 34'. When the bracket 19 is applied to a ridge beam 14 or 15, the tabs 33 are bent outwardly to underlie the ridge beam and are fastened thereto by a fastener 22. The tabs 34 are bent outwardly beside the ridge beam and are connected thereto by fasteners 22. The tabs 33 and 34 resist any tendency of the bracket 19 to move upwardly.

Figures 5, 7:
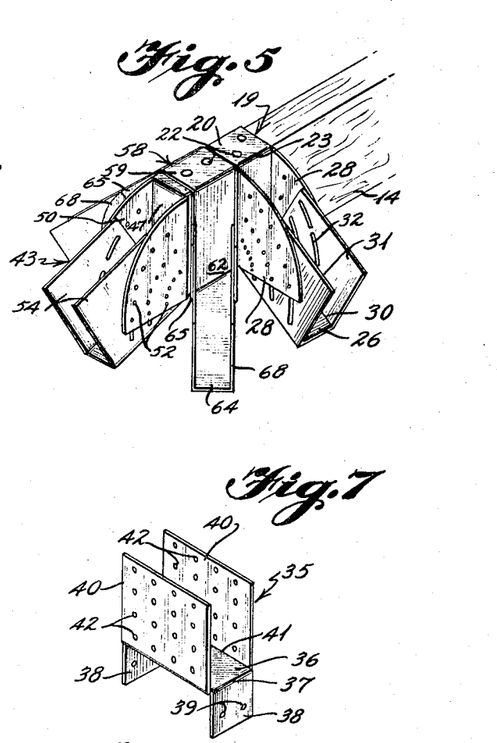
FIG. 5, a perspective thereof.
FIG. 7, a perspective of an anchor bracket.
Figure 16:
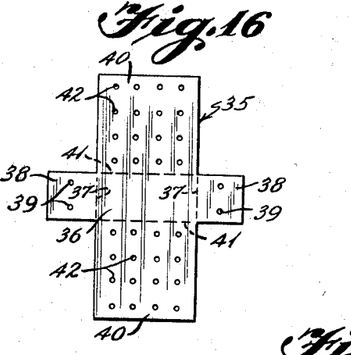
FIG. 16, a plan view of an anchor bracket blank.

The lower end of the rafter 18 is secured within an anchor bracket 35 mounted on the plate 12. As illustrated in FIGS. 7 and 16, such anchor bracket includes a central portion 36 connected along bend lines 37 to downwardly extending tabs 38 having nail receiving openings 39 therein for securing the bracket to the top plate 12. A pair of upwardly extending tabs 40 are connected to the central portion 36 along bend lines 41 and such tabs have nail receiving openings 42 so that the bracket 35 can be secured permanently to the lower portion of the rafter 18.

Figure 8:
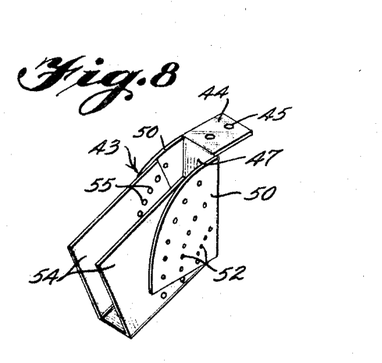
FIG. 8, a perspective of an adjustable single ridge bracket.
Figure 15:
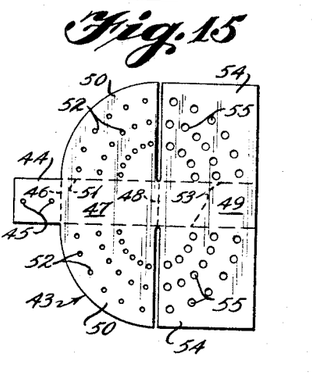
FIG. 15, a plan view of a single ridge bracket blank.

FIGS. 8 and 15 illustrate a modified form of rafter bracket 43 which is adapted to accommodate a single rafter on one side of the ridge beam. In this modification a tab or fastening portion 44 having openings 45 for the reception of nails or other fasteners is connected along bend lines 46 to the downwardly extending portion 47 which in turn is connected along bend lines 48 to an outwardly extending portion 49. The downwardly extending portion 47 has a pair of opposed tabs 50 connected thereto along bend lines 51 and such tabs are provided with a series of arcuately disposed openings 52. The outwardly extending portion 49 is connected along lines 53 to a pair of oppositely disposed tabs 54 each of which has a series of arcuately disposed openings 55 adapted to be aligned with the openings 52 in tabs 50 for the reception of fasteners by which the upper end of a rafter can be connected to the ridge beam. The bracket 43 also can be secured to the end of the ridge beam 14 to accommodate a king rafter 56 (FIG. 1) when the ridge beam does not extend to the end of the building. The downwardly extending portion 47 may have a tab 57 extending upwardly from the bend line 48 with a nail receiving opening therein and each of the opposed tabs 50 may have a smaller tab 50' located adjacent to the lower edge and connected to the downwardly extending portion 47 along the bend lines 51. When the bracket 43 is applied to the ridge beam, the tab 57 is disposed beneath such beam and connected thereto and the tabs 50' are bent outwardly along the side of the beam and connected thereto.

Figure 9:
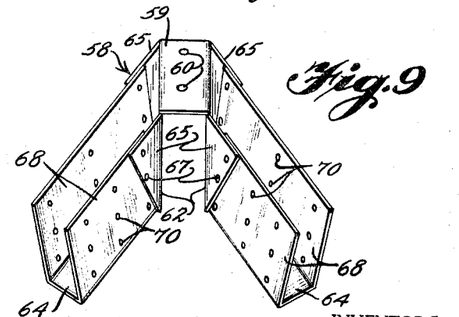
FIG. 9, a perspective of an adjustable double hip bracket.
Figure 17:
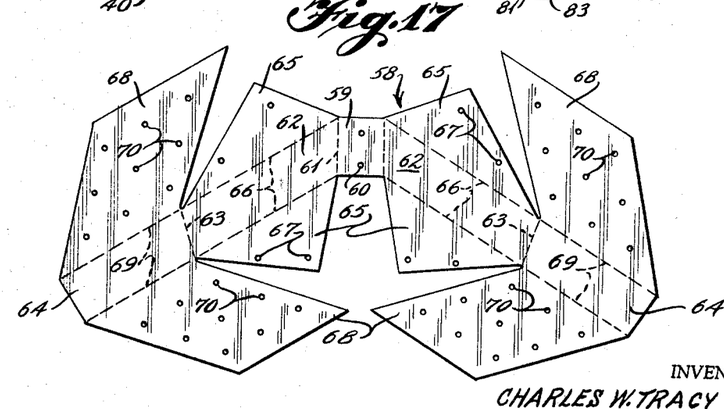
FIG. 17, a plan view of a double hip bracket blank.

When it is desired that the roof terminate in a flattened portion, a pair of hips 16 are connected at one end to the ridge beam and extend downwardly and outwardly to the corners of the side walls 11. In order to connect the hips to the ridge beam, a hip bracket 58 is provided as illustrated in FIGS. 9 and 17 and such bracket includes a central or fastening portion 59 having openings 60 for the reception of fasteners and such central portion is connected by bend lines 61 to downwardly extending portions 62 disposed at an angle to the central portion 59. The downwardly extending portions 62 are connected along bend lines 63 to outwardly extending portions 64 substantially in alignment with the downwardly extending portions 62. Such downwardly extending portions are provided with generally triangular tabs 65 connected at opposite sides thereof along bend lines 66 and provided with openings 67. A pair of tabs 68 are connected to opposite sides of the outwardly extending portions 64 along bend lines 69 and such tabs have a series of openings 70 some of which are adapted to be aligned with the openings 67 so that nails or other fasteners can pass through the aligned openings while other fasteners are adapted to pass through at least some of the openings 70 to connect the upper ends of the hips 16 to the ridge.

Figure 12:
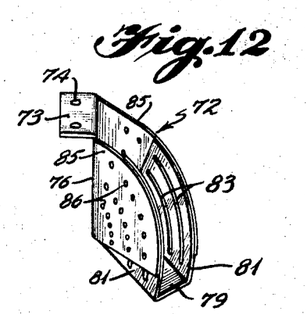
FIG. 12, a perspective of an adjustable single hip bracket.
Figure 18:
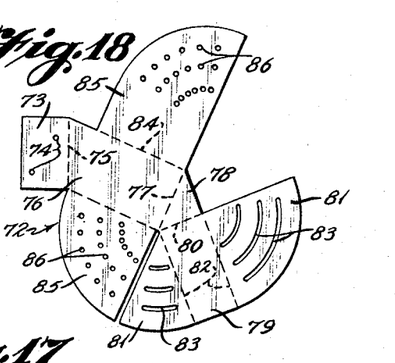
FIG. 18, a plan view of a single hip blank.

With reference to FIGS. 12 and 18, a modified form of hip bracket 72 is provided for connecting a single hip to the ridge beam. In this modification a tab or fastening portion 73 having openings 74 is provided connected along bend lines 75 to a downwardly extending portion 76 which in turn is connected along bend lines 77 to a triangular portion 78. An outwardly extending portion 79 is connected along bend lines 80 to one side of the triangular portion 78 and such outwardly extending portion is provided with a pair of oppositely disposed tabs 81 connected along bend lines 82 and each of such tabs has a series of elongated arcuately disposed slots 83. The downwardly extending portion 76 in connected along bend lines 84 to a pair of tabs 85 each of which has a series of arcuately disposed openings 86 adapted to be aligned with the slots 83 for the reception of nails or other fasteners for connecting a single hip to a ridge.

Figure 10:
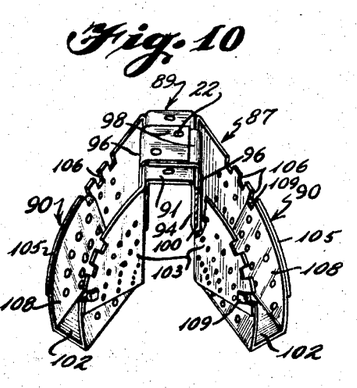
FIG. 10, a perspective of a modified form of an adjustable hip bracket.
Figure 11:
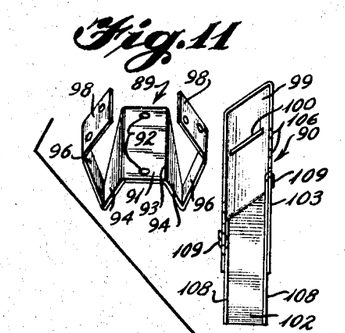
FIG. 11, an exploded perspective of the structure of FIG. 10.
Figure 20:
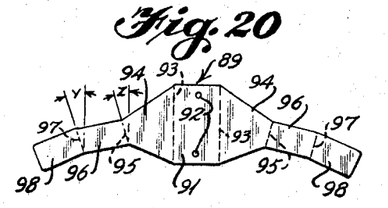
FIG. 20, a plan view of a hip and valley hanger blank.
Figure 21:
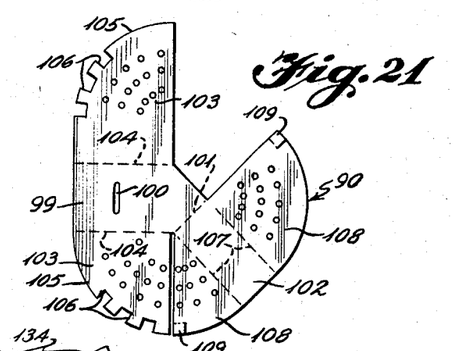
FIG. 21, a plan view of a hip blank for use with the hanger of FIG. 20.

With reference to FIGS. 10, 11, 20 and 21, an adjustable hip bracket 87 is provided for connecting one or more jack rafters 88 to the hip 16. Such bracket includes a hanger 89 mountable on the hip 16 and one or more jack rafter brackets 90 adapted to be suspended therefrom. The hanger 89 includes a central or fastening portion 91 having nail receiving openings 92, and such central portion is connected along bend lines 93 to downwardly extending portions 94. As illustrated in FIG. 20, each of the downwardly extending portions 94 is connected along a bend line 95 to an upwardly extending portion 96, such bend line being at an angle Z to the direction of the hip 16. The upwardly extending portion 96 is connected along a bend line 97, disposed at an angle Y to the hip 16, to an inwardly extending portion 98 adapted to overlie the hip and be connected thereto by fasteners 22 (FIG. 10).

The jack rafter brackets 90 (FIG. 21) include a downwardly extending portion 99 having a slot 100 therein of a size to accommodate the upwardly extending portion 96 of the hanger 89 and to be mounted thereon along the bend line 95. The downwardly extending portion 99 is connected along a bend line 101 to an outwardly extending portion 102 disposed at an angle to such downwardly extending portion. A pair of opposed tabs 103 are connected to opposite sides of the downwardly extending portion 99 along bend lines 104 and each of such tabs has an arcuaate edge 105 having a plurality of notches or serrations 106 therein. The outwardly extending portion 102 is connected along bend lines 107 to a pair of opposed tabs 108 each of which has an integral bendable member 109 so that when the jack rafter bracket 90 is assembled the bendable members 109 can be bent into the notches 106 to retain the same in assembled relation. If desired the bendable members 109 and notches 106 may be staggered so that only one bendable member and notch will be in alignment to secure the bracket 90 in assembled relation.

Figure 19:
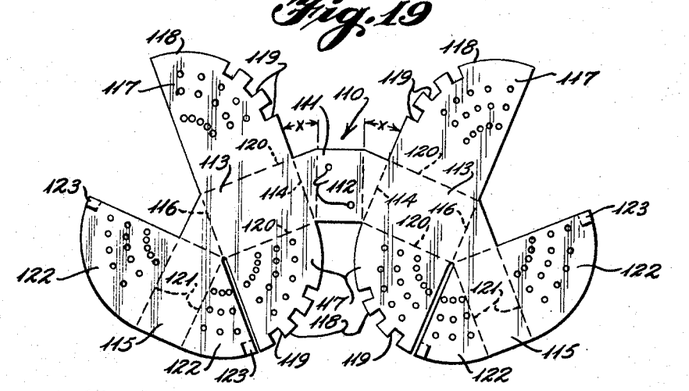
FIG. 19, a plan view of a modified form of a double hip blank.

With reference to FIG. 19 a modified form of jack rafter bracket 110 is provided having a central or fastening portion 111 with fastener receiving openings 112 therein and such central portion is connected to a downwardly extending portion 113 along bend lines 114, such downwardly extending portion being disposed at an angle X to the central portion 111. An outwardly extending portion 115 is connected along bend lines 116 to the downwardly extending portion 113 and such outwardly extending portion is located at an angle to the downwardly extending portion 113. A pair of opposed tabs 117, each having an arcuate edge 118 with notches or serrations 119 therein, are connected to the downwardly extending portion 113 along bend lines 120 and the outwardly extending portion 115 is connected along bend lines 121 to a pair of tabs 122 each of which may have a bendable member 123 receivable within the notches 119 when the bracket is assembled.

Figure 13:
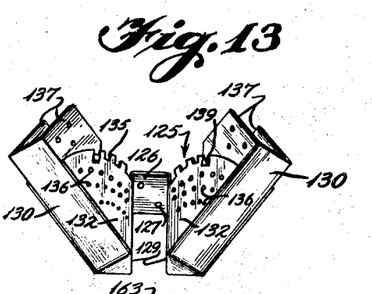
FIG. 13, a perspective of an adjustable double valley bracket.
Figure 22:
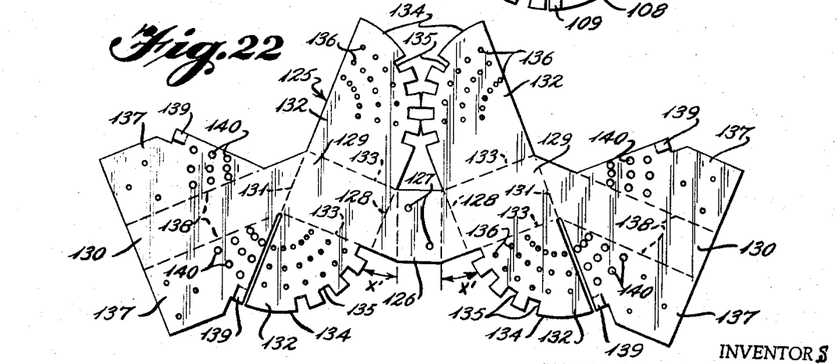
FIG. 22, a plan view of a double valley blank.

With reference to FIGS. 13 and 22 a valley bracket 125 is provided having a central or fastening portion 126 with fastener receiving openings 127 therein, and such central portion is connected along bend lines 128 to downwardly extending portions 129 at an angle X'. At the opposite end of the downwardly extending portions 129 an outwardly and upwardly extending portion 130 is connected along bend lines 131 at an angle thereto. A pair of tabs 132 are connected to the downwardly extending portions 129 on opposite sides thereof along bend lines 133 and each of such tabs has an arcuate edge 134 with a series of recesses or serrations 135 located along such arcuate edge. A series of arcuately disposed openings 136 are located within the tabs 132 through which fasteners are adapted to extend to connect the bracket to a jack rafter along the valley 17. A pair of tabs 137 are connected along bend lines 138 to opposite sides of the outwardly and upwardly extending portions 130 and each of such tabs has a bendable portion 139 adapted to be received within the serrations 135 of the tabs 132 to retain the bracket 125 in assembled relation. The tabs 137 have a series of arcuately disposed openings 140 which are alignable with the openings 136 so that the fasteners can pass through the overlapping tabs into the rafter.

Figure 23:
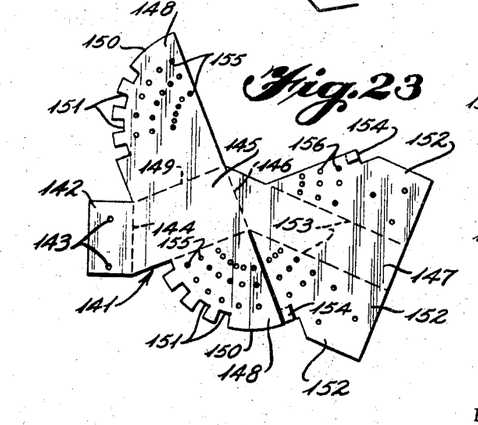
FIG. 23, a plan view of a single valley blank.

FIG. 23 illustrates a modified form of valley bracket 141 which is similar to the bracket 125 with the exception that this bracket was designed for a single rafter and includes a tab or fastening portion 142 having openings 143 and such tab is adapted to overlie the valley beam 17. The tab 142 is connected along bend lines 144 to a downwardly extending portion 145 the opposite end of which is connected along bend line 146 to an outwardly and upwardly extending portion 147. The downwardly extending portion 145 has a pair of tabs 148 connected along opposite sides thereof along bend lines 149. Each of such tabs has an arcuate edge 150 along which a series of recesses or serrations 151 are located. The outwardly and upwardly extending portion 147 has a pair of tabs 152 on opposite sides thereof and connected thereto along bend lines 153. Each of the tabs 152 has a bendable portion 154 receivable within the serrations 151 to retain the bracket in assembled relation. The tabs 148 and 152 have a series of openings 155 and 156 respectively which are alignable with each other when the bracket is assembled so that a fastener 22 can be inserted through the aligned openings into the jack rafter to positively connect such jack rafter to the valley beam 17.

Figure 24:
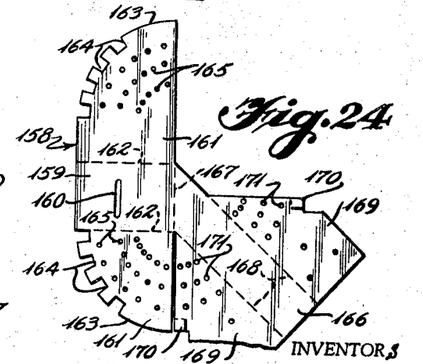
FIG. 24, a plan view of a valley blank for use with the hanger of FIG. 20.

FIG. 24 illustrates a further modified form of valley bracket 158 having a downwardly extending portion 159 with a slot 160 therein of a size to cooperatively receive the hanger 89 to support such bracket on the valley beam 17. The downwardly extending portion 159 has a pair of tabs 161 connected to opposite sides thereof along bend lines 162 and such tabs may have an arcuate edge 163 with a plurality of recesses or serrations 164 therein. Each of the tabs 161 has a series of arcuately disposed openings 165 for the reception of fasteners 22 in the manner previously described. An outwardly and upwardly extending portion 166 is connected to the end of the downwardly extending portion 159 along bend lines 167 and such outwardly and upwardly extending portion is connected along bend lines 168 to a pair of opposed tabs 169 each of which has a bendable portion 170 adapted to be received within the serrations 164 when the bracket is assembled. Each of the tabs 169 has a plurality of arcuately disposed openings 171 adapted to cooperate and be aligned with openings 165.

In the operation of the device the rafters 18 are first cut to a predetermined length and thereafter the adjustable rafter supporting brackets 19 which have been bent into position but not secured in assembled relation, may be spaced along the ridge beam 14 and mounted thereon by fasteners 22. Also if the roof is to have a hip 16, one of the hip brackets 58, 72 or 88 can be attached to the end of the ridge beam. The ridge beam is supported in position by any conventional temporary means and cooperating anchor brackets are spaced along the top plate 12 and fastened thereto. Rafters 18, hips 16, and valleys 17 then are placed in the appropriate brackets and secured thereto by fasteners 22 both at the ridge beam and at the top plate of the side walls. Additional jack rafter brackets are then mounted on the hips and valleys after which the jack rafters are connected thereto by fasteners to permanently secure all of the rafters to the roof structure. Since the rafters have been precut to a desired length, no additional cutting, notching or trimming is necessary and the roof structure can be assembled in a minimum of time by unskilled workmen, the only requirement being that the brackets be correctly spaced according to building codes and fixed in position by nails or other fasteners. After the roof framing is in position the temporary means for holding the ridge beam can be removed and the roof can be applied to the framing in a conventional manner.

It will be apparent that a relatively simple adjustable roof bracket system has been provided which will accommodate roofs of any desired pitch design and which can be erected in a minimum of time by relatively unskilled workmen.

It will be obvious to one skilled in the art that various changes may be made in the invention without departing

What is claimed is:

1. An adjustable rafter supporting bracket comprising the combination of a supporting hanger and a rafter receiving bracket, said hanger including a fastening portion, at least one downwardly extending portion connected to said fastening portion, and an upwardly extending hook-forming portion connected to said downwardly extending portion, said rafter receiving bracket including a downwardly extending portion having a slot of a size to receive the hook-forming portion of said hanger, a first pair of tab means mounted on said downwardly extending portion, an outwardly extending portion carried by said downwardly extending portion, a second pair of tab means mounted on said outwardly extending portion, said first and second tab means being bendable into overlapping relation with each other, whereby said hanger can be mounted on a roof structure and will support at least one adjustable rafter receiving bracket.

2. The structure of claim 1 in which said first and second tab means include locking means to maintain said tab means in overlapping position.

3. An angularly adjustable supporting bracket for connecting a rafter to the ridge beam of a building comprising a fastening portion adapted to overlie said ridge beam, means for attaching said fastening portion to said ridge beam, a downwardly extending portion connected to said fastening portion and adapted to be disposed along the side of said ridge beam, first tab means on opposite sides of said downwardly extending portion, said first tab means being bent outwardly at an angle to said downwardly extending portion, a series of openings in each of said first tab means, an outwardly extending portion connected to said downwardly extending portion and being angularly adjustable relative thereto, second tab means on opposite sides of said outwardly extending portion, said second tab means being bent upwardly at an angle to said outwardly extending portion, a series of openings in said second tab means, said first tab means and said second tab means being in overlapping relation with each other and at least certain of said openings being in alignment and adapted to receive a fastener for connecting the tab means to a rafter, whereby a rafter having a square end is supported by said bracket at any desired angle.

4. The structure of claim 3 in which said downwardly extending portion includes third tab means underlying said ridge beam, and fastening means connecting said third tab means to said ridge beam.

5. The structure of claim 3 in which said series of openings in one of said first and second tab means includes elongated slots.

References Cited

UNITED STATES PATENTS

| | | | |
|---|---|---|---|
| 753,053 | 7/1903 | Eberhardt | 287—20.94 |
| 862,498 | 3/1907 | Mohan | 287—20.94 X |
| 1,551,714 | 9/1925 | Tuschkan | 287—20.92 |
| 1,657,243 | 1/1928 | Daniels. | |
| 2,013,101 | 9/1935 | Inglee | 52—713 |
| 3,036,347 | 5/1962 | Findleton | 287—20.94 |
| 3,333,875 | 8/1967 | Tracy | 287—20.94 |

HENRY C. SUTHERLAND, *Primary Examiner.*

U.S. Cl. X.R.

52—92, 665, 702; 287—20.92

UNITED STATES PATENT OFFICE
CERTIFICATE OF CORRECTION

Patent No. 3,423,898　　　　　　　　　　　　　　January 28, 1969

Charles W. Tracy et al.

Figure 2:
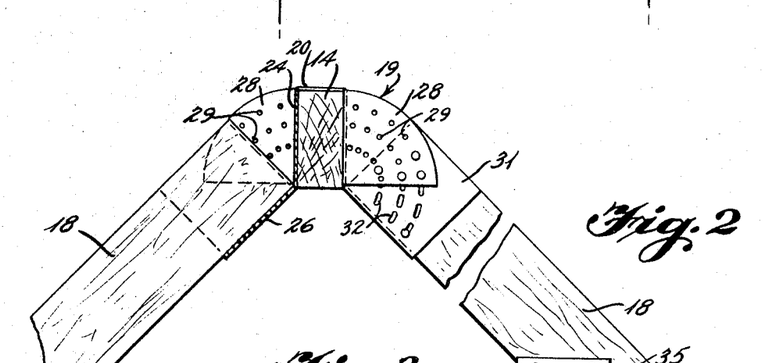
FIG. 2, an enlarged fragmentary section on the line 2—2 of FIG. 1, illustrating an adjustable double ridge bracket and an anchor bracket.
Figure 3:
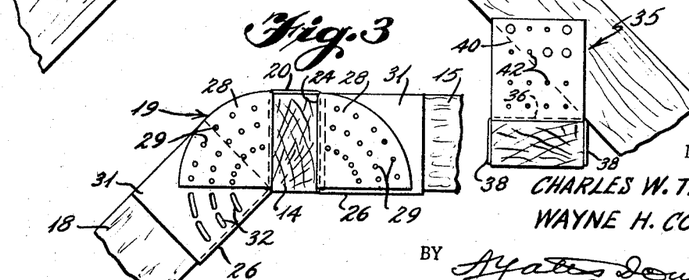
FIG. 3, an enlarged section on the line 3—3 of FIG. 1, illustrating a ridge bracket connecting two ridges and a rafter.

It is certified that error appears in the above identified patent and that said Letters Patent are hereby corrected as shown below:

Figs. 2 and 3 should be read with square-shaped openings at the lower inner corners of flaps 28 and with the squares of material or tabs 34 bent from flaps 28 lying along the member 14 and fastened thereto with fasteners. Additionally a pair of overlapping tabs or flaps 33 bent from the downwardly extending portion 24 of the bracket should be included beneath member 14 and fastened thereto with fasteners 22.

Figures 4, 6:
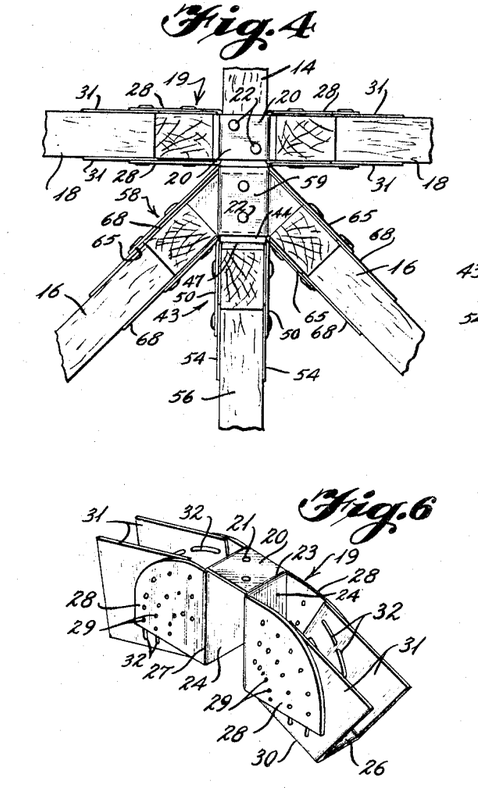
FIG. 4, an enlarged top plan view of one end of a ridge which terminates in hips.
FIG. 6, a perspective of an adjustable double ridge bracket.

Fig. 6 should be read with rectangularly shaped tabs 34 having fastener receiving openings 34' therethrough lying in the planes of the material at the lower inner corners of flaps 28. Additionally a rectangularly shaped tab 33 having a fastener receiving opening therethrough lying in the plane of the material should be included at the lower mid-part of downwardly extending portion 24. Tab 33 is integral with the material 24 at the lowermost end thereof.

Fig. 8 should be read with a rectangular tab 50' lying in the plane of flap 50 and a rectangular tab 57 extending normally to the plane of portion 47. Fastener receiving opening should be included in tab 50' and tab 57.

Figure 14:
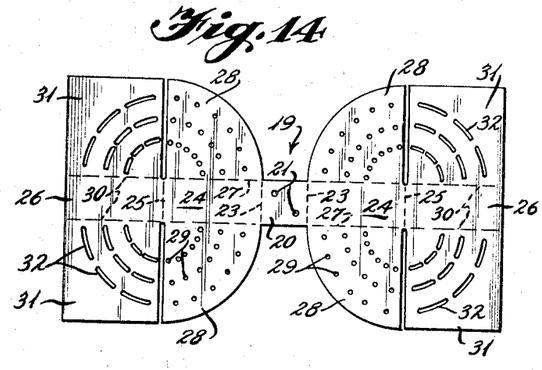
FIG. 14, a plan view of a double ridge bracket blank.

Fig. 14 should be read with rectangularly shaped tabs 34 having fastener receiving opening 34' lying in the plane of the material at each of the inner corners of flaps 28. Additionally rectangularly shaped tabs 33 having fastener receiving opening 33' therein should be shown lying in the plane of the material 24 interjoining the left-hand and right-hand sections of the bracket. Tabs 33 are integral with the material along bend lines 25. Reference numeral 29 should be included on the lower-right flap 28 to indicate the innermost arcuate row of opening through flap 28.

Fig. 15 should be read with rectangularly-shaped tabs 50' at the inner corners of flaps 50 and a rectangularly-shaped tab 57 in the part of the material between flaps 50. Each of the tabs lies in the plane of the material and tab 57 is integrally joined with the material along a bend line 48 extending between the slots separating sections 54 from flaps 50, 50.

Signed and sealed this 7th day of July 1970.

(SEAL)
Attest:

EDWARD M. FLETCHER, JR.
Attesting Officer

WILLIAM E. SCHUYLER, JR.
Commissioner of Patents